(12) United States Patent
Malik et al.

(10) Patent No.: US 6,832,280 B2
(45) Date of Patent: Dec. 14, 2004

(54) DATA PROCESSING SYSTEM HAVING AN ADAPTIVE PRIORITY CONTROLLER

(75) Inventors: Afzal M. Malik, Austin, TX (US); William C. Moyer, Dripping Springs, TX (US); William C. Bruce, Jr., Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 521 days.

(21) Appl. No.: 09/927,123

(22) Filed: Aug. 10, 2001

(65) Prior Publication Data

US 2003/0033461 A1 Feb. 13, 2003

(51) Int. Cl.⁷ .......................... G06F 12/00; G06F 13/36
(52) U.S. Cl. .................. 710/200; 710/116; 710/113
(58) Field of Search ............................... 710/200, 266, 710/116, 52, 113, 35

(56) References Cited

U.S. PATENT DOCUMENTS

| | | | |
|---|---|---|---|
| 4,729,093 A | 3/1988 | Mothersole et al. | |
| 5,553,268 A | 9/1996 | Willenz et al. | |
| 5,572,686 A | * 11/1996 | Nunziata et al. | 710/116 |
| 5,572,734 A | * 11/1996 | Narad et al. | 710/200 |
| 5,577,230 A | 11/1996 | Argade et al. | |
| 5,904,732 A | 5/1999 | Greenley et al. | |
| 6,014,722 A | 1/2000 | Rudin et al. | |
| 6,029,223 A | * 2/2000 | Klein | 710/266 |
| 6,032,232 A | 2/2000 | Lindeborg et al. | |
| 6,058,461 A | 5/2000 | Lewchuk et al. | |
| 6,108,738 A | * 8/2000 | Chambers et al. | 710/113 |
| 6,145,033 A | 11/2000 | Chee | |
| 6,185,637 B1 | * 2/2001 | Strongin et al. | 710/35 |
| 6,233,645 B1 | 5/2001 | Chrysos et al. | |
| 6,671,752 B1 | * 12/2003 | Rao et al. | 710/52 |

OTHER PUBLICATIONS

MPC603e & EC603e, RISC Microprocessor User's Manual, Chapter 1 Overview, Rev. 1, 1997 Motorola, pp. 1–1 to 1–38.
MC88110, Second Generation RISC Microprocessor User's Manual, Section 6, Instruction and Data Caches, Motorola, pp. 6–1 to 6–45.
Form PCT/ISA/2062.

* cited by examiner

Primary Examiner—Tim Vo
(74) Attorney, Agent, or Firm—Susan C. Hill

(57) ABSTRACT

The present invention relates generally to data processors and more specifically, to data processors having an adaptive priority controller. One embodiment relates to a method for prioritizing requests in a data processor (12) having a bus interface unit (32). The method includes receiving a first request from a first bus requesting resource (e.g. 30) and a second request from a second bus requesting resource (e.g. 28), and using a threshold corresponding to the first or second bus requesting resource to prioritize the first and second requests. The first and second bus requesting resources may be a push buffer (28) for a cache, a write buffer (30), or an instruction prefetch buffer (24). According to one embodiment, the bus interface unit (32) includes a priority controller (34) that receives the first and second requests, assigns the priority, and stores the threshold in a threshold register (66). The priority controller (34) may also include one or more threshold registers (66), subthreshold registers (68), and control registers (70).

37 Claims, 10 Drawing Sheets

DATA PROCESSING SYSTEM HAVING AN ADAPTIVE PRIORITY CONTROLLER

FIELD OF THE INVENTION

The present invention relates generally to data processors, and more specifically to data processors having an adaptive priority controller.

RELATED ART

Microprocessors with separate instruction and data caches generally need to prioritize requests to a single main memory. The operations on the instruction side of the central processing unit (CPU) include instruction fetches, instruction change of flow fetches, and instruction pre-fetches. The data operations in the CPU include load operations and store operations. Modem data processors also often include write buffers, push buffers for modified cache data, and an instruction cache and data cache (write through or copy back). Since the instruction cache and data cache (including write/push buffers) operate independently, simultaneous requests to the main memory can occur. The main memory and the external peripherals may be running at a fraction of the CPU frequency. Efficient prioritization of requests to the main memory can reduce the number of stall cycles required of the CPU and thus increase the overall system performance. It is thus desirable to more efficiently prioritize multiple requests to the main memory.

BRIEF DESCRIPTION OF THE DRAWINGS

The present invention is illustrated by way of example and is not limited to the embodiments illustrated in the accompanying figures, in which like references may indicate similar elements.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The terms "assert" and "negate" are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Brackets are used to indicate the conductors of a bus or the bit locations of a value. For example, "bus 60 [0–7]" or "conductors [0–7] of bus 60" indicates the eight lower order conductors of bus 60, and "address bits [0–7]" or "ADDRESS [0–7]" indicates the eight lower order bits of an address value. The symbol "$" preceding a number indicates that the number is represented in its hexadecimal or base sixteen form. The symbol "%" preceding a number indicates that the number is represented in its binary or base two form.

DESCRIPTION OF FIGURES

Figure 1:
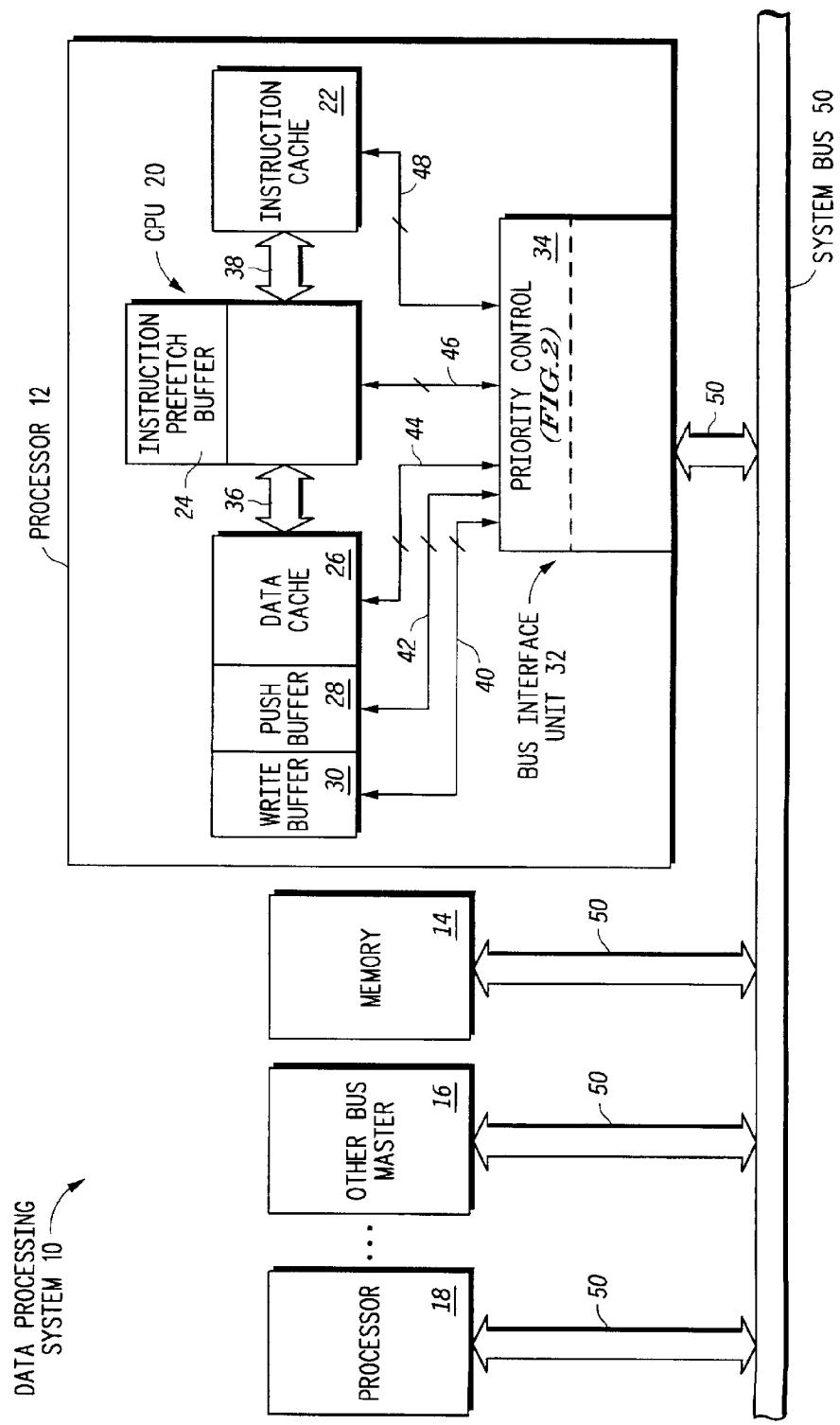
FIG. 1 illustrates, in block diagram form, a data processing system in accordance with one embodiment of the present invention.

FIG. 1 illustrates one embodiment of data processing system 10. In one embodiment, data processing system 10 includes processor 12, memory 14, other bus masters 16, processor 18, and possibly other bus masters or bus slaves which are bi-directionally coupled to each other by way of system bus 50. In one embodiment, processor 12 includes a CPU 20 which is bi-directionally coupled to instruction cache 22 by way of bus 38. In one embodiment, CPU 20 is bi-directionally coupled to data cache 26, push buffer 28, and write buffer 30 by way of bus 36. CPU 20 is bi-directionally coupled to bus interface unit 32 (BIU 32) by way of signals 46. Instruction cache 22 is bi-directionally coupled to BIU 32 by way of signals 48. Data cache 26 is bi-directionally coupled to BIU 32 by way of signals 44. Push buffer 28 is bi-directionally coupled to BIU 32 by way of signals 42. Write buffer 30 is bi-directionally coupled to BIU 32 by way of signals 40. In one embodiment of the present invention BIU 32 includes priority control circuitry 34. Note that system bus 50 may be used as a communication bus to communicate between processor 12, memory 14, other bus masters 16, processor 18, and any other bus master or slave coupled to system bus 50.

Figure 2:
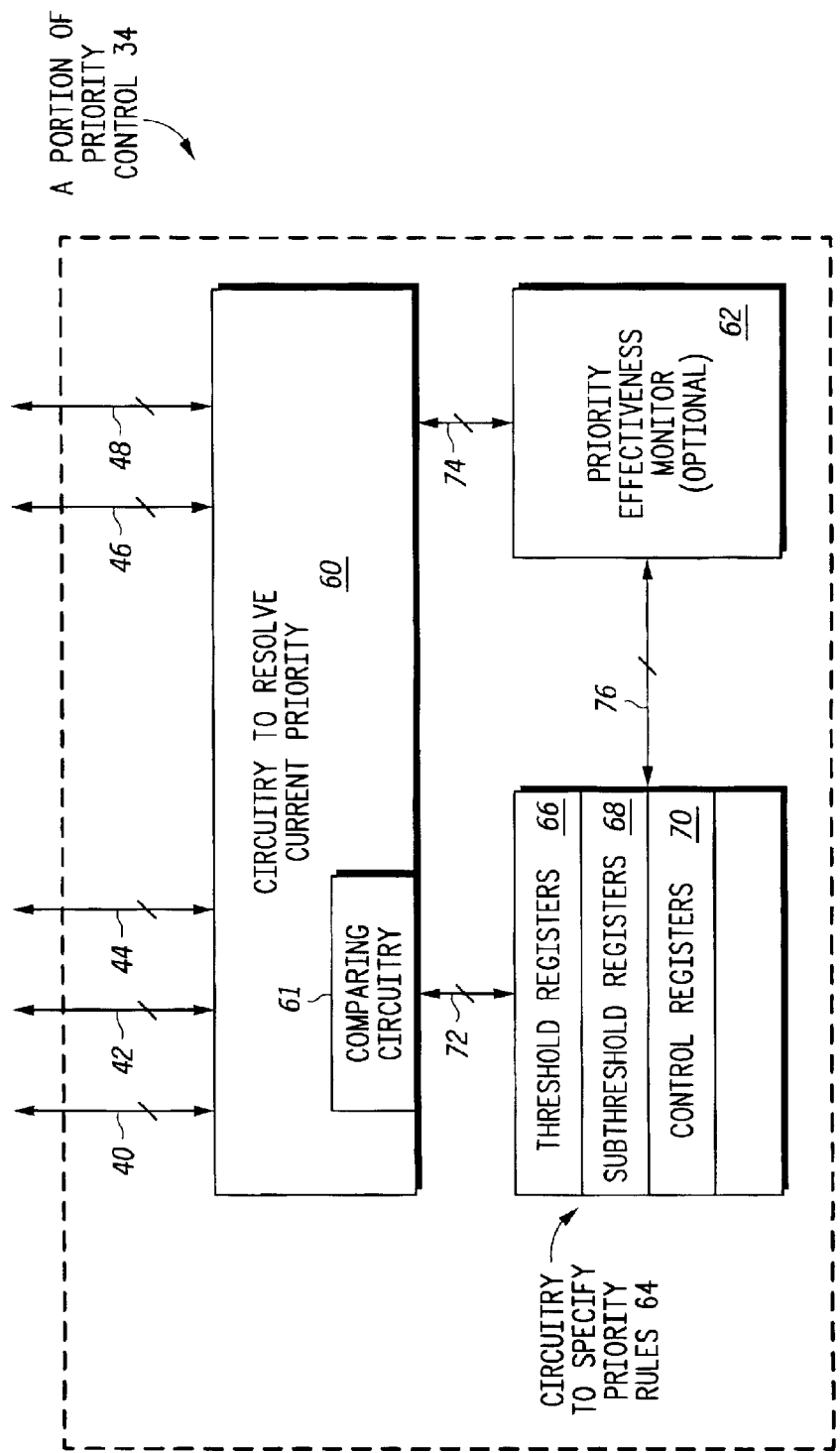
FIG. 2 illustrates, in block diagram form, a portion of a priority controller in accordance with one embodiment of the present invention.

FIG. 2 illustrates one embodiment of a portion of priority control circuitry 34 of FIG. 1. In one embodiment of the present invention, priority control circuitry 34 includes circuitry to resolve current priority circuitry 60, priority effectiveness monitor 62, and circuitry to specify priority rules 64. Note that alternate embodiments of the present invention may or may not include priority effectiveness monitor 62. Circuitry 60 is bi-directionally coupled to signals 40, 42, 44, 46, and 48. Circuitry 60 includes comparing circuitry 61. Circuitry 60 is bi-directionally coupled to circuitry 64 by way of signals 72. In one embodiment of the present invention, circuitry to specify priority rules 64 includes threshold registers 66, sub-threshold registers 68, and control registers 70. In alternate embodiments of the present invention, circuitry 64 may include additional registers or other circuitry. In one embodiment of the present invention, circuitry 64 is bi-directionally coupled to an optional priority effectiveness monitor 62. In the embodiment of the present invention illustrated in FIG. 2, circuitry 60 is bi-directionally coupled to priority effectiveness monitor 62 by way of signals 74.

Figure 3:
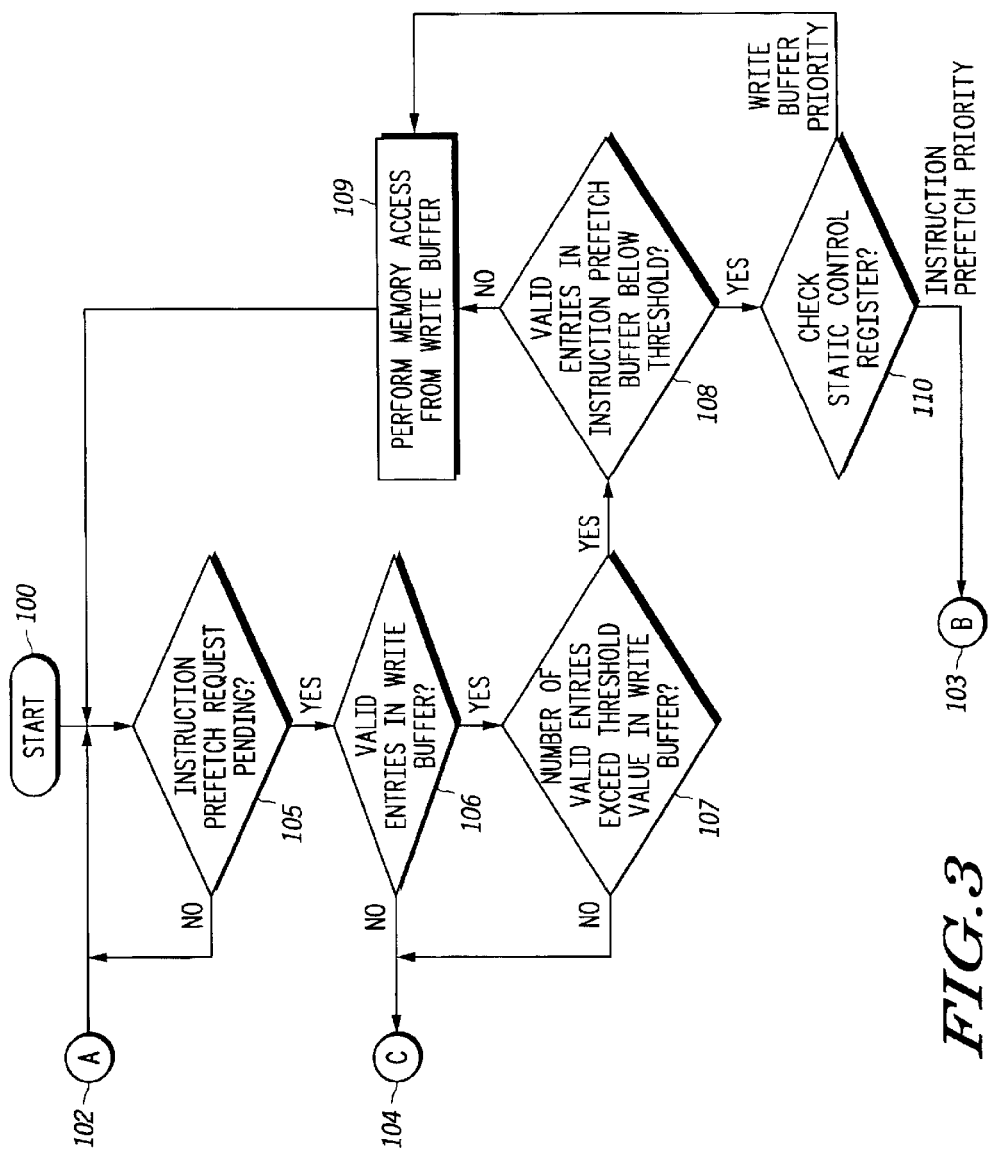
FIGS. 3–10 illustrate, in flow diagram form, methods for prioritizing requests in accordance with various embodiments of the present invention.
Figure 4:
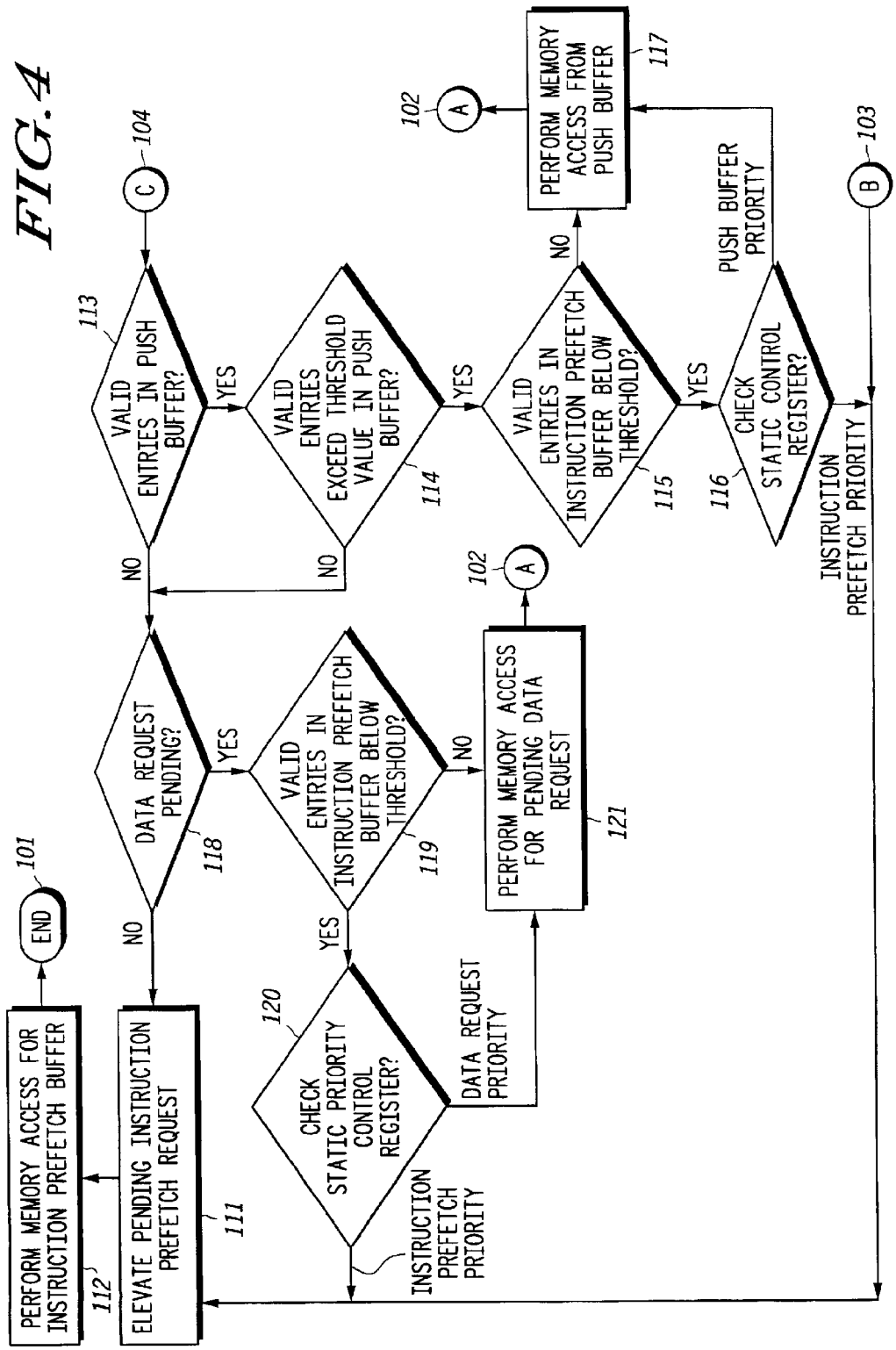

FIGS. 3 and 4 together illustrate one manner in which priority control 34 (see FIG. 1) implements an adaptive priority control methodology based on the number of valid entries in write buffer 30 and push buffer 28. Alternate embodiments of the present invention may significantly vary the flow illustrated in FIGS. 3 and 4. The methodology used in FIGS. 3 and 4 is merely intended to be one possible implementation. Referring to FIG. 3, the flow starts at start oval 100. The flow then proceeds to decision diamond 105 where the question is asked, is an instruction prefetch request pending. If an instruction prefetch is not pending, the flow continues to wait at that decision diamond until an instruction prefetch request is pending. Once an instruction prefetch request is pending, the flow continues to decision diamond 106 where the question is asked, are there any valid entries in write buffer 30. If there are valid entries in write buffer 30, then the flow continues at decision diamond 107 where the question is asked, do the number of valid entries in write buffer 30 exceed its threshold value. If the answer to decision diamond 107 is yes, the flow continues to decision diamond 108 where the question is asked, are the number of valid entries in instruction prefetch buffer 24 below the threshold of prefetch buffer 24. If the answer to decision diamond 108 is no, then the flow continues at step 109 where a memory access from write buffer 30 is performed. From step 109 the flow then continues back to decision diamond 105. If the number of valid entries in instruction prefetch buffer 24 is below its threshold, then the flow continues at decision diamond 110 where the question is asked, how has the user programmed the static control registers 70 to determine priority at this point. If the user has programmed priority for write buffer 30, then the flow continues from decision diamond 110 to step 109. However if the user has programmed the instruction prefetch buffer 24 to have priority, then the flow continues from decision diamond 110 to step 111 (see FIG. 4) by way of circle B 103. In step 111 the pending instruction prefetch request is elevated. The flow then continues to step 112 where a memory access for the instruction prefetch buffer 24 is performed. By elevating the priority of the instruction prefetch request, it becomes the highest priority request and is thus performed in step 112. The flow then continues from step 112 to oval 101 where the flow ends.

Returning to decision diamond 106, if there are no valid entries in write buffer 30, the flow continues at decision diamond 113 (see FIG. 4) by way of circle C 104. Similarly, the no path from decision diamond 107 also continues at decision diamond 113 by way of circle C 104. Decision diamond 113 asks the question, are there any valid entries in push buffer 28. If there are valid entries in push buffer 28, the flow continues at decision diamond 114 where the question is asked, do the valid entries in push buffer 28 exceed its threshold value. If the answer to decision diamond 114 is yes, then the flow continues at decision diamond 115 where the question is asked, are the number of valid entries in instruction prefetch buffer 24 below its threshold. If the answer to decision diamond 115 is yes, the flow continues at decision diamond 116 where the values in static control registers 70 are checked in order to determine how the user has programmed the priority. If the user has programmed the push buffer 28 to have priority, then the flow continues from decision diamond 116 to step 117 where the memory access from push buffer 28 is performed. From step 117, the flow then continues to decision diamond 105 by way of circle A 102. At this point in the flow, a return to decision diamond 105 is useful to check whether an instruction prefetch request is still pending. There are cases where an instruction prefetch request may have been pending the first time through decision diamond 105, but may no longer be pending. Returning back to decision diamond 116, if on the other hand, static control registers 70 contains user programmable information which selects the instruction prefetch buffer 24 to have priority, then the flow continues from decision diamond 116 to step 111 which has been described previously herein.

Referring now to decision diamonds 113 and 114, if the NO path from either of these decision diamonds is taken, the flow continues at decision diamond 118. Note that this point in the flow indicates that there are no valid entries in push buffer 28 or that the valid entries do not exceed the threshold value of push buffer 28. Decision diamond 118 asks, are there any data requests pending. If no data request is pending, the flow continues from decision diamond 118 to step 111 described herein above. However if a data request is pending, the flow continues from decision diamond 118 to decision diamond 119 where the question is asked, are the number of valid entries in the instruction prefetch buffer 24 below its threshold. If the answer to decision diamond 119 is yes, the flow continues at decision diamond 120 where the question is asked, what priority has been programmed into control registers 70 by the user. If the user has selected the instruction prefetch buffer 24 to have priority, the flow continues from decision diamond 120 to step 111 described herein above. However, if the user has programmed control registers 70 to select that data requests have priority, then the flow continues from decision diamond 120 to step 121 where a memory access for the pending data request is performed. From step 121, the flow then continues to decision diamond 105 by way of circle A 102. Referring to decision diamond 119, if the number of valid entries in instruction prefetch buffer 24 is below its threshold, the flow continues at step 121 where a memory access for the pending data request is performed. Referring to decision diamond 118, if there are no data requests pending, then the flow continues at step 111. Referring to decision diamond 115, if the number of valid entries in instruction prefetch buffer 24 is below its threshold, then the flow continues at step 117 where a memory access from push buffer 28 is performed. From step 117, the flow then continues to decision diamond 105 by way of circle A 102.

Figure 5:
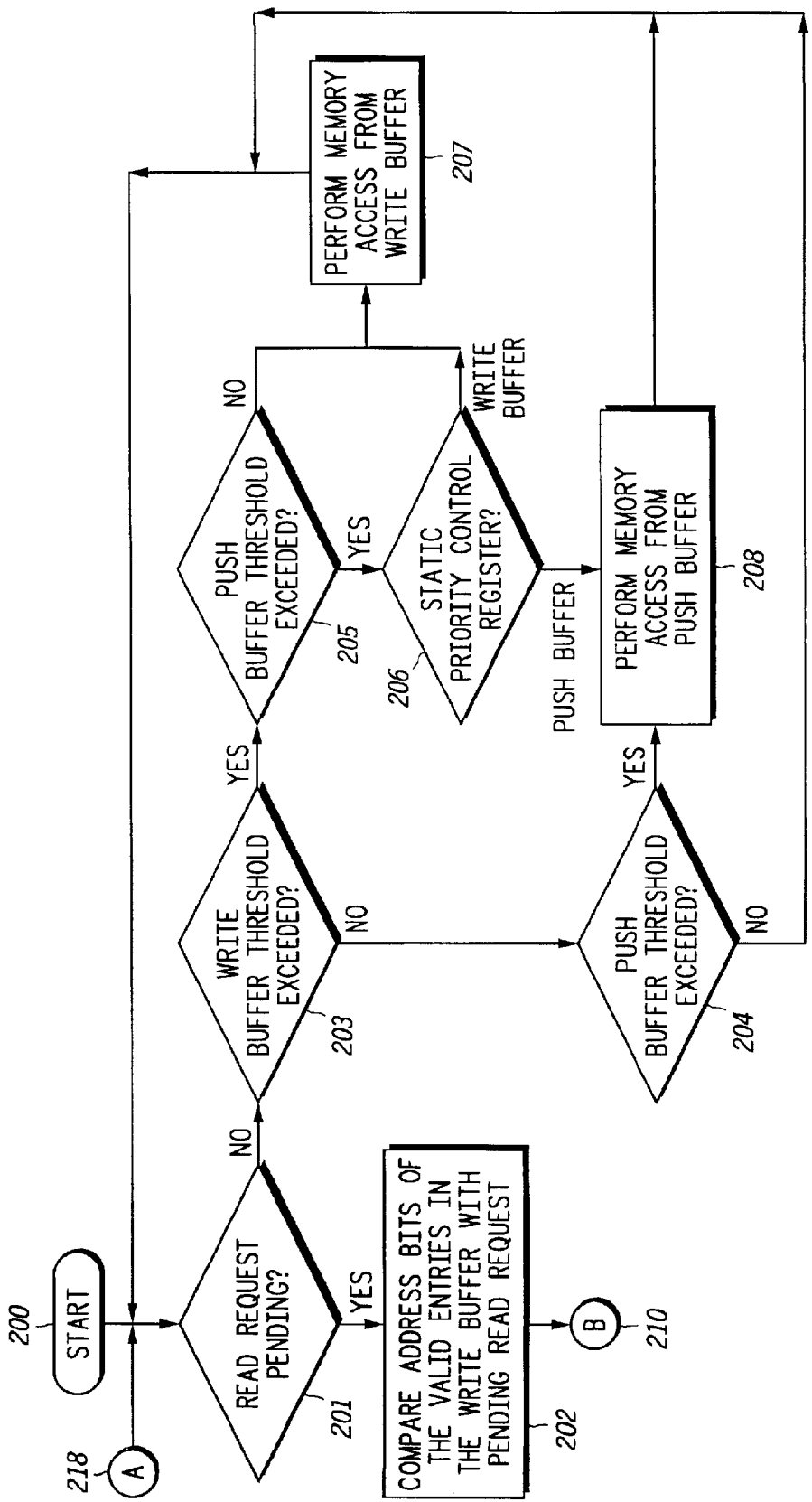
Figure 6:
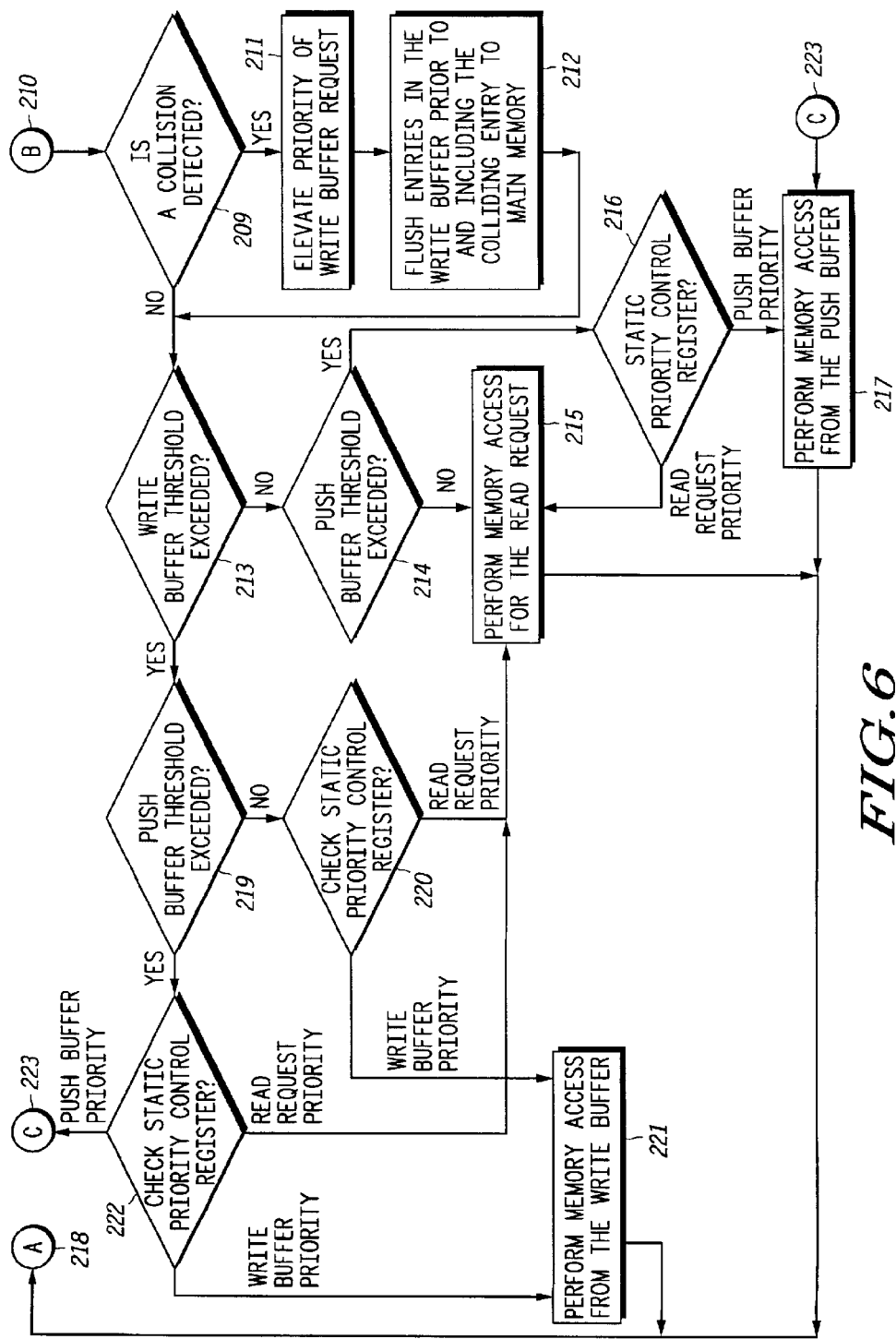

FIGS. 5 and 6 illustrate one way in which priority control circuitry 34 (see FIG. 2) may implement a method for priority switching in order to alleviate collisions in write buffer 30. Referring to FIG. 5, the flow starts at start oval 200. The flow then proceeds to decision diamond 201 where the question is asked, are any read requests pending. If there is a read request pending, the flow continues from decision diamond 201 to step 202 where the address bits of the valid entries in write buffer 30 are compared with the address for the pending read request. Referring again to decision diamond 201, if there are no read requests pending, the flow continues to decision diamond 203 where the question is asked, has write buffer 30 exceeded its threshold value. If write buffer 30 has not exceeded its threshold value, the flow continues from decision diamond 203 to decision diamond 204 where the question is asked, has push buffer 28 exceeded its threshold value. If push buffer 28 has not exceeded the threshold value, then the flow continues from decision diamond 204 to decision diamond 201 where the question is again asked, are there any read requests pending. In this case, neither the push buffer nor the write buffer have exceeded their respective thresholds, so no memory accesses need to be performed yet for those buffers, and a check is performed again to see if a read request has become pending. Referring again to decision diamond 203, if the write buffer 30 has exceeded its threshold, then the flow continues at decision diamond 205 where the question is asked, has push buffer 28 exceeded its threshold. If the push buffer 28 has exceeded its threshold, then the flow continues from decision diamond 205 to decision diamond 206 where the question is asked, what is the priority indicated by control registers 70. In this case, both buffers have more entries than their respective thresholds have been set to represent (i.e. the user selected thresholds have been exceeded). If the user has programmed control registers 70 to select the write buffer 30 to have priority, then the flow continues from decision diamond 206 to step 207 where a memory access from write buffer 30 is performed. Referring again to decision diamond 205, if the threshold of push buffer 28 has not been exceeded, then the flow continues at step 207 also. Referring again to decision diamond 206, if control registers 70 have been programmed by the user to select the push buffer 28 to have priority, then the flow continues at step 208 where a memory access from push buffer 28 is performed. Referring again to decision diamond 204, if the number of entries in push buffer 28 exceeds its threshold, then the flow continues at step 208. Once the respective memory accesses performed in steps 207 and 208 are performed, the flow continues at decision diamond 201.

Referring again to step 202, the flow then continues at decision diamond 209 (see FIG. 6) by way of circle B 210. In decision diamond 209 the question is asked, is a collision detected. Note that in one embodiment of the present invention, a collision has been considered to occur when an entry in write buffer 30 contains data that corresponds to an address associated with the pending read request. Referring to decision diamond 209, if a collision is detected the flow continues at step 211 where the priority of the write buffer request is elevated. From step 211 the flow then continues at step 212 where entries in the write buffer 30 prior to and including the colliding entry are flushed to main memory (e.g. memory 14 in FIG. 1) in order to remove the colliding entry. From step 212 the flow then continues at decision diamond 213. Referring to decision diamond 209, if a collision is not detected, flow also continues at decision diamond 213. Decision diamond 213 asks the question, has the write buffer 30 threshold been exceeded. If the write buffer 30 threshold has not been exceeded, the flow continues from decision diamond 213 to decision diamond 214 where the question is asked, has the push buffer 28 threshold been exceeded. If the push buffer 28 threshold has not been exceeded, the flow continues at step 215 where a memory access for the read request is performed. Note that because neither buffer threshold has been exceeded, the pending read request should have priority. However if the push buffer 28 threshold has been exceeded, the flow continues at decision diamond 216 where control registers 70 are used to determine priority. If the user has programmed push buffer 28 to have priority over the pending read, then the flow continues from decision diamond 216 to step 217 where a memory access from push buffer 28 is performed. However if the user has programmed control registers 70 to give the read request priority, then the flow continues from decision diamond 216 to step 215 where a memory access for the read request is performed. Step 215 and 217 both continue at decision diamond 201 by way of circle A 218.

Referring again to decision diamond 213, if the write buffer 30 threshold has been exceeded, the flow continues at decision diamond 219 where the question is asked, has the push buffer 28 threshold been exceeded. If the push buffer 29 threshold has not been exceeded, the flow continues at decision diamond 220 where control registers 70 are again used to determine priority. If the user has programmed control registers 70 to select the read request as having priority over the write buffer request, then the flow continues from decision diamond 220 to step 215 where a memory access for the read request is performed. However if the user has programmed control registers 70 (see FIG. 2) to give priority to write buffer 30 over the pending read request, then the flow continues at step 221 where a memory access from write buffer 30 is performed. Referring to decision diamond 219, if the push buffer 28 has exceeded the threshold, the flow continues at decision diamond 222 where control registers 70 are used to determine the priority. If the user has programmed registers 70 to give the push buffer 28 priority, then the flow continues at step 217 by way of circle C 223. However, if the user has programmed control registers 70 to give priority to write buffer 30, then the flow continues at step 221. If the user has programmed control registers 70 to give priority to read requests, then the flow continues at step 215. Referring to both steps 221 and 217, after the memory access is performed, the flow continues at decision diamond 201 by way of circle 218.

Figure 7:
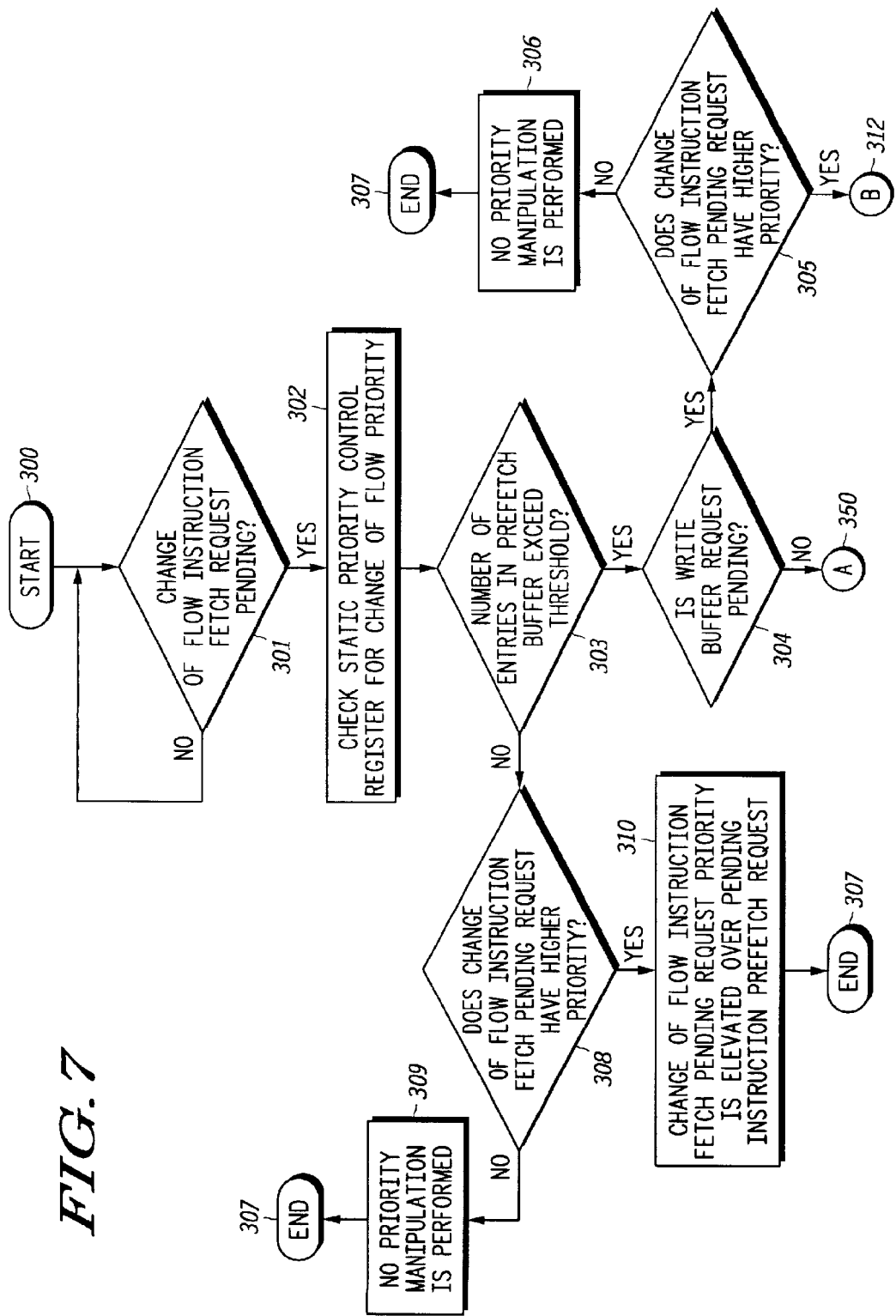
Figure 8:
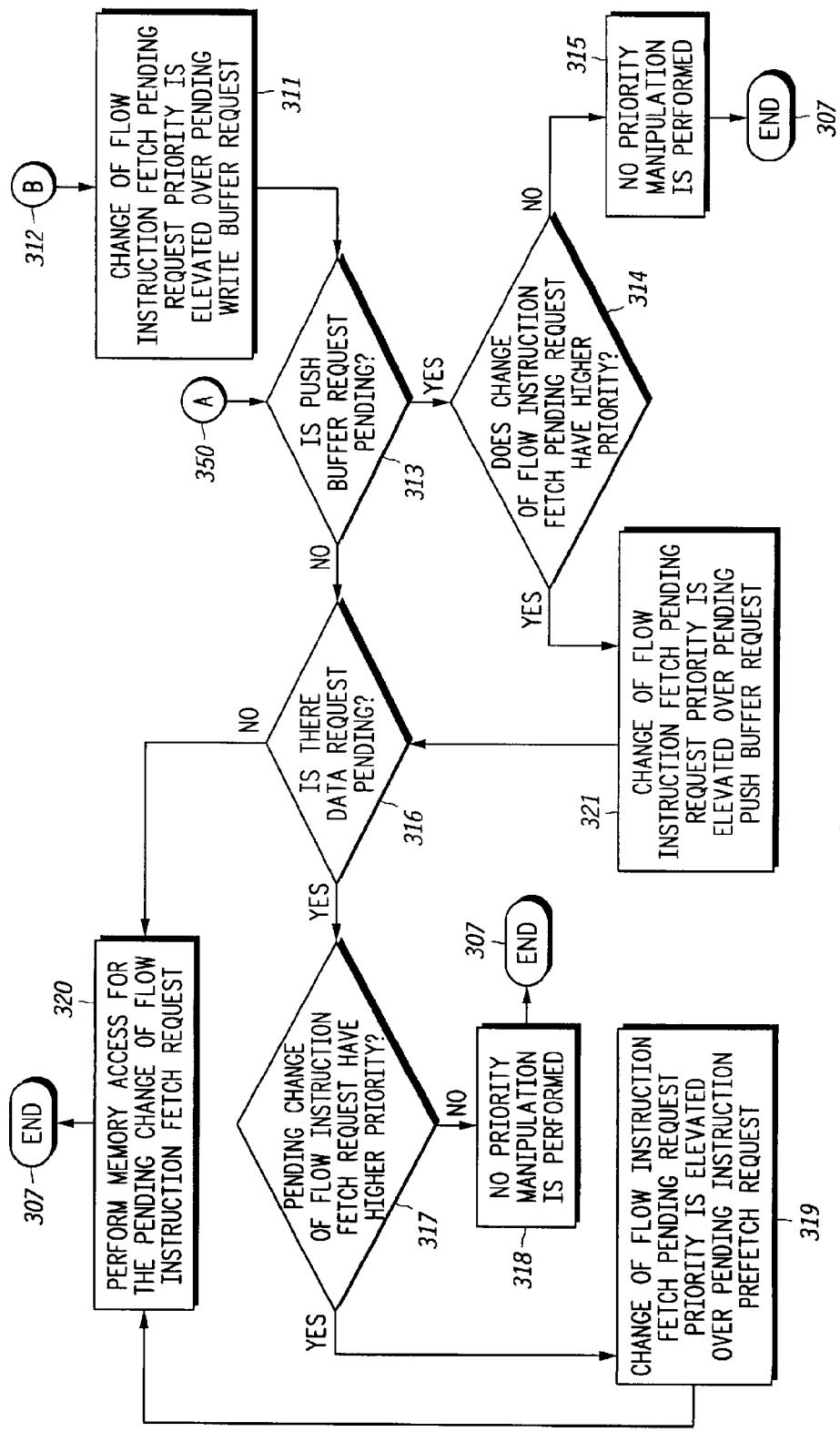

FIGS. 7 and 8 illustrate one way in which priority control circuitry 34 (see FIG. 1) implements priority elevation based on a change of instruction flow. The flow starts at oval 300. The flow then proceeds to decision diamond 301 where the question is asked, is a change of flow instruction fetch request pending. Note that the instruction fetch request referred to in decision diamond 301 is the result of a previous instruction that caused a change of flow. If a change of flow instruction fetch request is pending, the flow continues from decision diamond 301 to step 302 where control registers 70 are used to determine the change of flow priority. Information from control registers 70 are used in subsequent decision diamonds throughout the flow to determine relative priorities of change of flow accesses, prefetch buffer accesses, write buffer accesses, and push buffer accesses. Referring to decision diamond 301, if there is no change of flow instruction fetch request pending, then the flow continues to check for such a request. From step 302 the flow then proceeds to decision diamond 303 where the question is asked, do the number of entries in the instruction prefetch buffer 24 exceed the threshold of instruction prefetch buffer 24. If the number of entries in instruction prefetch buffer 24 do exceed its threshold, the flow continues at decision diamond 304 where the question is asked, is a write buffer 30 request pending. If a write buffer 30 request is pending, the flow continues from decision diamond 304 to decision diamond 305 where the question is asked, does the change of flow instruction fetch pending request have higher priority, based on the check performed at step 302. If the change of flow instruction fetch pending request does not have higher priority, the flow continues from decision diamond 305 to step 306 where no priority manipulation is performed due to the priority selected by the user in control registers 70. From step 306 the flow continues to oval 307 where the flow ends. Referring again to decision diamond 303, if the number of entries in instruction prefetch buffer 24 do not exceed its threshold, the flow continues at decision diamond 308 where the question is asked, does the change of flow instruction fetch pending request have higher priority, based on the check performed in step 302. If control registers 70 do not indicate that the change of flow instruction fetch pending request has higher priority, then the flow continues from decision diamond 308 to step 309 where no priority manipulation is performed. The flow then continues from step 309 to end 307. Referring to decision diamond 308, if the change of flow instruction fetch pending request has higher priority, then the flow continues from decision diamond 308 to step 310 where the change of flow instruction fetch pending request priority is elevated over the pending instruction prefetch request priority. From step 310 the flow then finishes at end 307.

Referring to decision diamond 305, if the change of flow instruction fetch pending request has higher priority, the flow continues at step 311 by way of circle B 312. At step 311 the change of flow instruction fetch pending request priority is elevated over the pending request from write buffer 30. From step 311 the flow continues at decision diamond 313 where the question is asked, is there a push buffer 28 request pending. If push buffer 28 does have a request pending, then the flow continues from decision diamond 313 to decision diamond 314 where the question is asked, does the change of flow instruction fetch pending request have higher priority. If the change of flow instruction fetch pending request does not have higher priority, then the flow continues from decision diamond 314 to step 315 where no priority manipulation is performed. From step 315 the flow then finishes at end 307. Referring to decision diamond 304 in FIG. 7, if there is no write buffer 30 request pending, then the flow continues at decision diamond 313 in FIG. 8 by way of circle A 350. Referring to decision diamond 313, if there is no push buffer 28 request pending, then the flow continues at decision diamond 316 where the question is asked, is there a data request pending. If there is a data request pending, then the flow continues from decision diamond 316 to decision diamond 317 where the question is asked, does the pending change of flow instruction fetch request have higher priority. If the pending change of flow instruction fetch request does not have higher priority, then the flow continues from decision diamond 317 to step 318 where no priority manipulation is performed. From step 318 the flow then finishes at end 307. Referring to decision diamond 317, if the pending change of flow instruction fetch request does have higher priority, then the flow continues at step 319 where the change of flow instruction fetch pending request priority is elevated over the pending instruction prefetch request. From step 319 the flow continues at step 320 where a memory access for the pending change of flow instruction fetch request is performed. Referring again to decision diamond 316, if there is no data request pending, the flow continues at step 320. Referring to decision diamond 314, if the change of flow instruction fetch pending request does have higher priority, then the flow continues at step 321 where the change of flow instruction fetch pending request priority is elevated over the pending request from push buffer 28. From step 321 the flow then proceeds to decision diamond 316. From step 320 the flow finishes at end 307.

Figure 9:
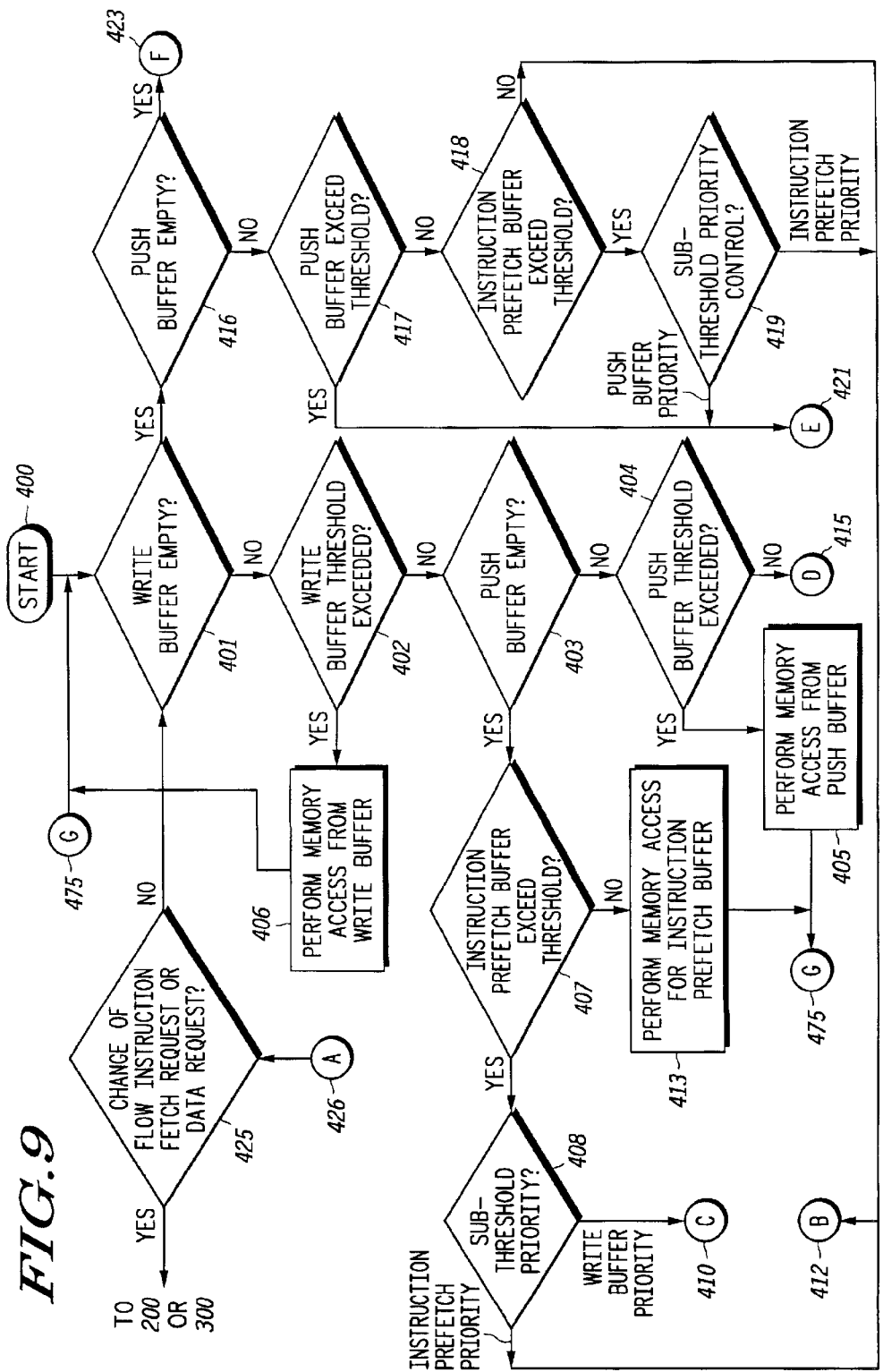
Figure 10:
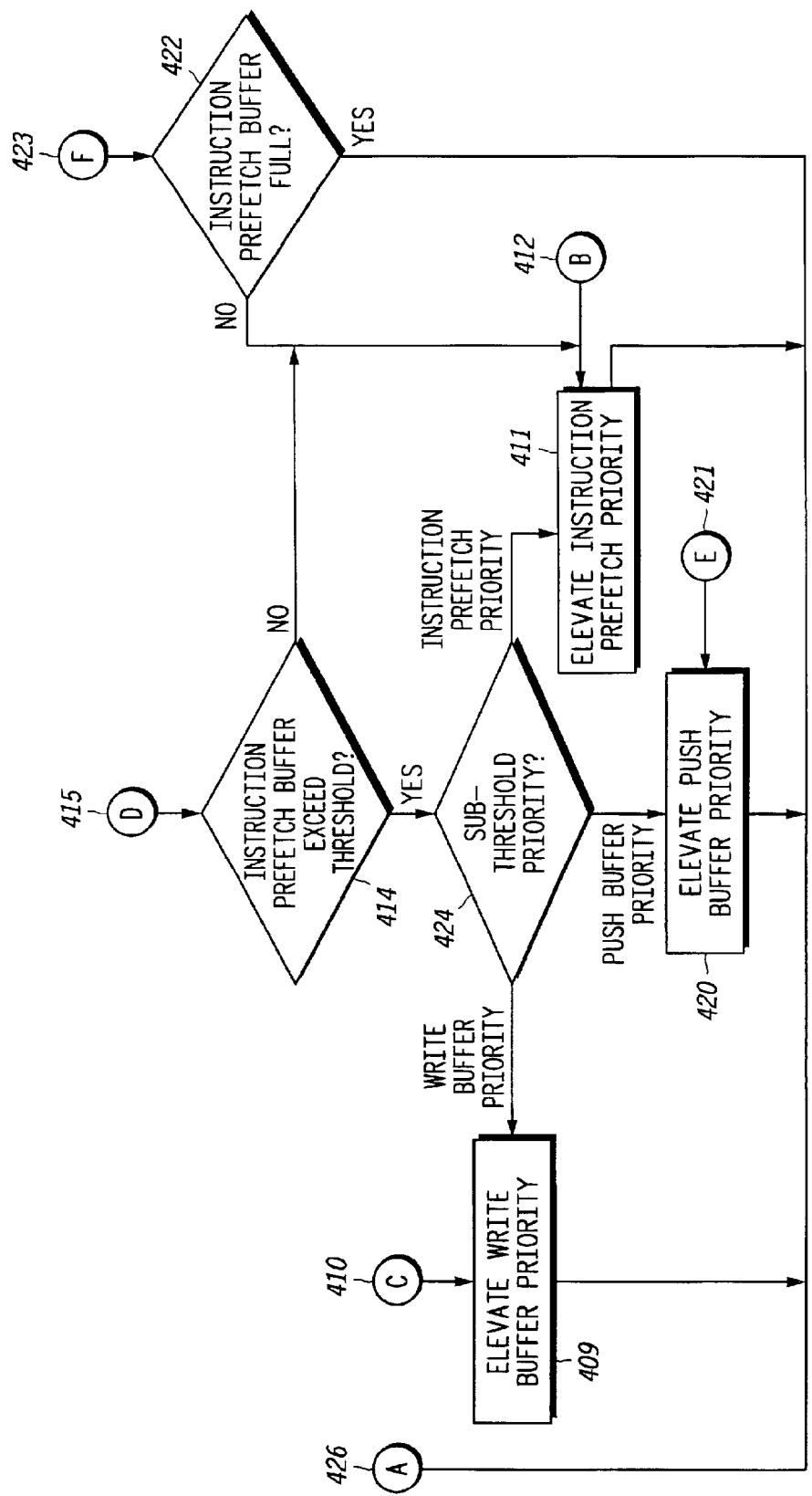

FIGS. 9 and 10 illustrate in flow chart form one way in which sub-thresholds may be used with the present invention. Subthresholds refer to the condition when a respective buffer has not reached its programmed level of fullness or emptiness. Referring to FIG. 9, the flow starts at oval 400. The flow then continues at decision diamond 401 where the question is asked, is write buffer 30 empty. If write buffer 30 is not empty, the flow continues from decision diamond 401 to decision diamond 402 where the question is asked, has the threshold for write buffer 30 been exceeded. If the threshold for write buffer 30 has not been exceeded, the flow continues from decision diamond 402 to decision diamond 403 where question is asked, is push buffer 28 empty. If push buffer 28 is not empty, the flow continues from decision diamond 403 to decision diamond 404 where the question is asked, has the threshold of push buffer 28 been exceeded. If the threshold of push buffer 28 has been exceeded, the flow continues to step 405 where a memory access from push buffer 28 is performed. From step 405 the flow continues at decision diamond 401 by way of circle G 475.

Referring to decision diamond 402, if the threshold for write buffer 30 has been exceeded, the flow continues at step 406 where a memory access from write buffer 30 is performed. From step 406 the flow continues at decision diamond 401. Referring to decision diamond 403, if push buffer 28 is empty the flow continues from decision diamond 403 to decision diamond 407 where the question is asked, has the threshold of instruction prefetch buffer 24 been exceeded. If the threshold of instruction prefetch buffer 24 has been exceeded, the flow continues at decision diamond 408 where the question is asked, based on how close the instruction prefetch buffer 24 and write buffer 30 are to their sub-threshold levels, which of the instruction prefetch buffer 24 and write buffer 30 should have priority. If through the use of sub-thresholds it is determined that write buffer 30 should have priority, the flow then continues at step 409 (see FIG. 10) by way of circle C 410. However if through the use of sub-thresholds it is determined that the instruction prefetch buffer 24 is to have priority, then the flow continues from decision diamond 408 to step 411 (see FIG. 10) by way of circle B 412. Referring to decision diamond 407, if the threshold of instruction prefetch buffer 24 has not been exceeded, the flow continues at step 413 where a memory access for instruction prefetch buffer 24 is performed. From step 413 the flow then continues to decision diamond 401 by way of circle G 475. Referring to decision diamond 404, if the threshold for push buffer 28 has not been exceeded, the flow continues to decision diamond 414 (see FIG. 10) by way of circle D 415. Referring to decision diamond 401, if write buffer 30 is empty, the flow continues to decision diamond 416 where the question is asked, is push buffer 28 empty. If push buffer 28 is not empty, the flow continues from decision diamond 416 to decision diamond 417 where the question is asked, has the threshold of push buffer 28 been exceeded. If the threshold of push buffer 28 has not been exceeded, the flow continues from decision diamond 417 to decision diamond 418 where the question is asked, has the threshold of instruction prefetch buffer 24 been exceeded. If the threshold of instruction prefetch buffer 24 has been exceeded, the flow continues from decision diamond 418 to decision diamond 419 where sub-thresholds are used to determine the priority between push buffer 28 and instruction prefetch buffer 24. Referring to decision diamond 419, if through the use of sub-thresholds it is determined that the push buffer should have priority due to its fullness, the flow continues to step 420 (see FIG. 10) by way of circle E 421. However, if the use of sub-thresholds indicates that the instruction prefetch buffer 24 is not as full and should thus have priority, the flow continues at step 411 (see FIG. 10) by way of circle B 412. Referring to decision diamond 418, if the threshold of instruction prefetch buffer 24 has not been exceeded, the flow continues at step 411 (see FIG. 10) by way of circle B 412. Referring to decision diamond 417, if the threshold of push buffer 28 has been exceeded, the flow continues at step 420 (see FIG. 10) by way of circle E 421. Referring to decision diamond 416, if push buffer 28 is empty, the flow continues from decision diamond 416 to decision diamond 422 (see FIG. 10) by way of circle F 423.

Referring to FIG. 10, circle D 415 proceeds to decision diamond 414 where the question is asked, has the threshold of instruction prefetch buffer 24 been exceeded. If the threshold of instruction prefetch buffer 24 has not been exceeded, the flow continues from decision diamond 414 to step 411 where the instruction prefetch priority is elevated. Referring to decision diamond 414, if the threshold of instruction prefetch buffer 24 has been exceeded, the flow continues from decision diamond 414 to decision diamond 424 where sub-thresholds are used to determine the priority between write buffer 30, push buffer 28, and instruction prefetch buffer 24. Referring to decision diamond 424, if the fullness of write buffer 30 compared to its sub-threshold value is used to determine that write buffer 30 should have priority, the flow continues at step 409 where the priority of write buffer 30 is elevated. If the fullness of push buffer 28 compared to its sub-threshold value is used to determine that push buffer 28 should have priority, then the flow continues from decision diamond 424 to step 420 where the priority of push buffer 28 is elevated. Similarly, if the fullness of instruction prefetch buffer 24 compared to its sub-threshold value is used to determine that the instruction prefetch buffer 24 should have priority, then the flow continues from decision diamond 424 to step 411 where the priority of the instruction prefetch buffer 24 is elevated. Note that comparing circuitry 61 and priority control 34 (see FIG. 2) may be used to perform the necessary comparisons of information (e.g. fullness, emptiness) from the various resources (e.g. 22, 24, 26, 28, and 30) and the predetermined or previously programmed priority criteria from a user programmable storage circuit (e.g. threshold levels, sub-threshold levels, priority tie-breaking information received from registers 66, 68, and 70).

From circle F 423 the flow continues at decision diamond 422 where the question is asked, is the instruction prefetch buffer 24 full. If the instruction prefetch buffer 24 is not full, the flow continues from decision diamond 422 to step 411 where the priority of the instruction prefetch buffer 24 is elevated. If the instruction prefetch buffer 24 is full, the flow continues from decision diamond 422 to decision diamond 425 (see FIG. 9) by way of circle A 426. Similarly, from step 409, step 420, and step 411 the flow continues at decision diamond 425 (see FIG. 9) by way of circle A426.

Referring again to FIG. 9, decision diamond 425 asks the question, is there a change of flow instruction fetch request or a data request. If there is not, the flow continues from decision diamond 425 to decision diamond 401. However, if there is a change of flow instruction fetch request or a data request, the flow continues from decision diamond 425 to either start oval 200 for a data request (see FIG. 5) or start oval 300 for a change of flow instruction fetch request (see FIG. 7).

In FIG. 10, once the priority of a buffer has been elevated in steps 409, 411, or 420, the respective buffer access may be performed.

DESCRIPTION OF OPERATION

In present day data processors there can be multiple sources of requests to a shared memory resource. For example, referring to FIG. 1, it is possible for multiple resources (e.g. instruction cache 22, instruction prefetch buffer 24, data cache 26, push buffer 28, and write buffer 30) to concurrently request access to memory 14. Note that the requests by instruction cache 22 and data cache 26 may be refill requests. It is also possible for other resources (e.g. other bus masters 16) to also request access to memory 14 at the same time. For example, other bus masters 16 may include a direct memory access (DMA) device. In alternate embodiments of the present invention, any type of circuitry may be trying to access a shared memory resource such as memory 14. Also, it is important to note that the various resources competing for access to a shared memory resource, such as memory 14, may be operating at significantly lower frequencies than CPU 20 and thus can produce stalls in CPU 20 by delaying access to shared resources. Referring to FIG. 1, although memory 14 has been illustrated as being external to processor 12, in alternate embodiments of the present invention any portions of the circuitry illustrated in FIG. 1 may be implemented on the same integrated circuit die, or partitioned into two or more separate integrated circuit die.

Referring to FIGS. 1 and 2, in one embodiment of the present invention, priority control circuitry 34 monitors signals from CPU 20 and dynamically checks for resource usage before assigning priority to a request which requires access and usage of system bus 50. The purpose of priority control circuitry 34 is to determine how close each of the competing resources (22, 24, 26, 28, 30) is to causing a stall in CPU 20. In one embodiment of the present invention priority control circuitry 34 will be programmed to give priority to the resource competing for bus 50 that is most likely to next cause a stall of CPU 20. For example, priority control 34 needs to ascertain how full write buffer 30 is because a full write buffer 30 can cause a stall of CPU 20. Similarly, a full push buffer 28 can cause a stall of CPU 20, and thus priority control circuitry 34 will also monitor how full push buffer 28 is. Priority control circuitry 34 will also monitor how full instruction prefetch buffer 24 is to ensure that instruction prefetch buffer 24 does not get so empty that it causes a stall of CPU 20.

In one embodiment of the present invention, priority control circuitry 34 monitors instruction cache 22 or CPU 20 in order to determine when a change of instruction flow is occurring. The reason priority control circuitry 34 wants to detect a change of instruction flow is that a change of instruction flow will cause the contents of instruction prefetch buffer 24 to no longer be useable and will require new instructions to be prefetched for the new instruction flow. Priority control circuitry 34 monitors data cache 26 in order to detect when a data cache miss has occurred and thus to detect that a data cache refill will be needed using system bus 50. If a data cache miss occurs, CPU 20 may be stalled until the data is retrieved across system bus 50. Thus it is desirable for priority control circuitry 34 to dynamically and flexibly adjust the priority between the various resources (22, 24, 26, 28, 30) which are competing for the use of system bus 50.

The present invention allows dynamic and adaptive priority manipulation in a data processing system 10. Referring to FIG. 2, in one embodiment, the present invention allows dynamic and adaptive priority manipulation based on the number of valid entries in write buffer 30 and push buffer 28. Note that push buffer 28 may also be called a write back or copy back buffer. Write buffer 30 may be implemented as a first-in first-out (FIFO) queue or buffer that can defer pending write misses or writes marked as write-through in order to maximize performance. When write buffer 30 is enabled, store operations which miss in data cache 26 or which are marked as write-through are placed in write buffer 30, and the access by CPU 20 is terminated. These buffered writes are held for later transfer to system bus 50. If a pending instruction cache 22 fill is requested while there are valid entries in write buffer 30, priority control circuitry 34 assigns priority based on the number of valid entries in write buffer 30. After emptying write buffer 30 to a predetermined threshold value (e.g. half the size of write buffer 30) the priority may be switched, and pending instruction cache 22 fill requests may be serviced. Upon completion of the instruction cache 22 fill requests, or if the number of valid entries in write buffer 30 becomes greater than the threshold value, the priority may be switched back to service the writes from write buffer 30. Alternate embodiments of the present invention may prioritize the requests from resources 22, 24, 26, 28, and 30 in any manner whatsoever using the user programmable portion of circuitry 64 (see FIG. 2). The described prioritization is just one possible prioritization among many.

Refer to FIGS. 3 and 4 and FIGS. 9 and 10 for one possible implementation of an adaptive priority control scheme based on the number of valid entries in write buffer 30 and push buffer 28. But again, note that alternate embodiments of the present invention may prioritize in any manner.

Priority control circuitry 34 may also implement priority switching in order to alleviate collisions in write buffer 30. One possible implementation of such a priority switching method is illustrated in FIGS. 5 and 6. For a read miss in data cache 26, address bits of the valid entries in write buffer 30 are compared (e.g. by way of comparing circuitry 61) with the read miss address in order to detect a collision. If a collision is detected, then all the entries in write buffer 30 prior to and including the colliding entry are flushed out to the main memory (e.g. memory 14). Priority control circuitry 34 may then switch the priority to the read miss of data cache 26 for servicing, and the remaining entries from the write buffer 30 may be written to main memory after servicing the read miss of data cache 26.

By increasing the threshold value of write buffer 30, more writes will be held in the buffer for a longer period of time before the threshold value is reached. Thus, the dynamic and programmable threshold feature of the present invention allows the entries to be present in the write buffer 30 for longer periods of time without impacting the performance of CPU 20. In this way, the external bus traffic (e.g. system bus 50) can be minimized further by write merging (i.e. write hits in write buffer 30).

In alternate embodiments of the present invention, priority control circuitry 34 may implement dynamic priority manipulation based on the number of valid entries in instruction prefetch buffer 24 and based on the size of instructions. In one embodiment, an instruction cache 22 read miss request can be categorized as either a sequential instruction pre-fetch, a sequential instruction fetch, or a change of flow condition. A threshold value can be programmed for instruction prefetch buffer 24. Sequential instruction pre-fetch requests can be serviced based on the threshold value and the size of the instructions (e.g. 16 bits, 32 bits, 64 bits).

In one embodiment of the present invention, priority control circuitry 34 may implement priority elevation based on change of flow conditions in CPU 20. Change of flow conditions can arise due to a speculative or non-speculative branch target fetch, an exception fetch, or jumps. The change of flow signal from CPU 20 may be used by priority control circuitry 34 to elevate the priority of a read miss due to a change of flow of instruction cache 22. The threshold value of write buffer 30 may be dynamically increased if a change of flow causes a miss in instruction cache 22, thus resulting in instruction cache 22 making a request to main memory 14. By increasing the threshold value, the relative priority of write buffer 30 may be lowered if the increased threshold value is above the current number of valid entries in write buffer 30. After servicing the change of flow request from instruction cache 22, the threshold value for write buffer 30 may be reduced and writes from write buffer 30 may be serviced until it reaches its threshold value before servicing another sequential request from instruction cache 22. Priority control circuitry 34 can be programmed so that change of flow requests take priority over pending sequential prefetch misses. This can be useful where the frequency of CPU 20 is higher than the frequency of main memory (e.g. memory 14), and prefetch requests are still outstanding when the change of flow occurs. Note that FIGS. 7 and 8 illustrate one possible way in which priority control circuitry 34 may implement a priority elevation scheme based on a change of flow condition. Alternate embodiments of the present invention may implement such a scheme in any manner.

Note that priority control circuitry 34 may implement a variety of ways to dynamically alter the priority scheme. For example, control registers 70 (see FIG. 2) may be used to program a wide variety of priority schemes, some or all of which may be dynamically altered by the user under software control. Note that in alternate embodiments of the present invention the priority scheme implemented by priority control circuitry 34 may be mask programmable, dynamically programmable by the user during the operation of processor 12, may be implemented in one-time programmable registers, or any other type of storage medium or circuitry which allows selection of the priority scheme by the user of processor 12 at least once.

Referring to FIG. 2, threshold registers 66 may store one or more thresholds for each resource within processor 12 which is seeking access to system bus 50. Sub-threshold registers 68 may be used by priority control circuitry 34 as indicators of how close the various resources in processor 12 (22, 24, 26, 28, 30) are to reaching their respective threshold values stored in threshold registers 66. Thus priority control circuitry 34 may use the sub-threshold registers 68 to make informed decisions regarding priority when various resources have not yet reached their threshold values. Referring to FIG. 2, comparing circuitry 61 may be used by circuitry 60 in order to compare the threshold value stored in threshold registers 66 with the incoming status values from instruction prefetch buffer 24, push buffer 28, and write buffer 30. In one embodiment of the present invention, threshold registers 66 store a threshold value which specifies a fullness level of each of the buffer resources (24, 28, 30). The status information provided from these buffers (24, 28, 30) to comparing circuitry 61 indicates how full the respective buffer currently is.

Note that requests for instruction prefetch buffer 24 are used to fill the buffer, and it exceeds its threshold once the number of valid entries is greater than the predetermined threshold. In contrast, requests from push buffer 28 and write buffer 30 are generated to empty these buffers. Once their respective number of valid entries have exceeded their respective thresholds, the generated requests imply that a higher priority is needed.

In one embodiment of the present invention priority control circuitry 34 may be adapted to implement programmable instruction/data priority for simultaneous sub-threshold requests. In the case of simultaneous requests to use system bus 50, if the instruction prefetch buffer 24 is near full (i.e. has low priority) and write buffer 30 has few entries (i.e. less than its threshold value), the action of priority control circuitry 34 can be programmed based on differences in the number of valid entries in both buffers and the respective threshold values. In other words, if buffer 24 has exceeded its threshold (implying fullness), and buffers 28 and 30 have not exceeded their respective threshold values (implying they have not reached a full state), then priority control circuitry 34 may use sub-threshold values stored in sub-threshold registers 68 in order to determine the respective priority between buffers 24, 28, and 30. As an example if instruction prefetch buffer 24 is fetching instructions from a slow memory and the data for data requests is located in a fast memory, priority control circuitry 34 can be programmed to give priority to instruction requests from instruction prefetch buffer 24 over data requests from write buffer 30 or push buffer 28 when subthreshold conditions exist. In alternate data processing systems, it may be preferable to give priority to write buffer 30 when subthreshold conditions exist in order to avoid a future read collision with a write buffer entry.

Referring to FIG. 2, some embodiments of the present invention may utilize a priority effectiveness monitor 62 which monitors the performance of processor 12 and adaptively modifies the priority programming in priority control circuitry 34. Thus priority effectiveness monitor 62 may adjust the priority scheme of priority control circuitry 34 based on the performance of processor 12. In the embodiment illustrated in FIG. 2, priority effectiveness monitor 62 monitors the performance of the system by monitoring signals within circuitry 60. Priority effectiveness monitor 62 modifies the priority of priority control circuitry 34 by modifying values in threshold registers 66 and/or sub-threshold registers 68 and/or control registers 70. Note that the circuitry to specify priority rules 64 may include other circuitry which may or may not be user programmable but which is used to specify or assist in specifying the priority scheme used within processor 12.

Although a variety of priority schemes for processor 12 have been described herein, alternate embodiments of the present invention may use any priority scheme. Thus priority control circuitry 34 may be used to implement any priority scheme between any number of resources within processor 12 (e.g. 22, 24, 26, 28, and 30) which are competing for any common resource (e.g. system bus 50). In one embodiment, priority control circuitry 34 will implement a priority scheme which minimizes the amount of time which CPU 20 will be stalled due to conflicts accessing a shared resource such as system bus 50. Alternate embodiments of the present invention may adjust the priority scheme used by priority control circuitry 34 in order to minimize or maximize some other selected criteria. For example, the performance of CPU 20 may be measured in some other way other than the time that CPU 20 is stalled. For example, one criteria that may be used by priority control circuitry 34 is a goal of minimizing the traffic on system bus 50. Alternate embodiments of the present invention may select any goal for processor 12 or data processing system 10 which is desired. This selective goal may then be measured by any criteria (e.g. CPU 20 stalls, or system bus 50 utilization) which is desired. Referring to FIG. 2, although the present invention has been described in the context of threshold values, alternative embodiments of the present invention may use other mechanisms to weigh and specify the desired fullness or emptiness of selected resources. For example some resources (e.g. data cache 26 and instruction cache 22) do not use threshold values. Instead values may be stored in a storage circuit (e.g. control registers 70) which may then be used by priority control circuitry 34 to determine the priority scheme to be used between data cache 26 and instruction cache 22. Note that in alternate embodiments of the present invention a user may provide program information to priority control circuitry 34 by way of system bus 50 or other integrated circuit terminals which access processor 12 (not shown).

Although the invention has been described with respect to specific conductivity types or polarity of potentials, skilled artisans appreciated that conductivity types and polarities of potentials may be reversed.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data processor comprising:
a central processing unit;
a first requesting resource counted to the central processing unit, and adapted to request use of a communications bus for transmitting or receiving data;
a second requesting resource coupled to the central processing unit, and adapted to request use of the communications bus for transmitting or receiving data; and
a bus interface unit coupled to the central processing unit, the first requesting resource, and the second requesting resource, and adapted to be coupled to the communications bus, the bus interface unit further comprising:
a priority controller coupled to receive a first request from the first requesting resource and a second request from the second requesting resource, and to assign a priority to each of the first and second request based on a threshold corresponding to one of the first requesting resource and the second requesting resource, wherein the priority controller comprises storage circuitry for storing a first resource threshold corresponding to the first requesting resource, a second resource threshold corresponding to the second requesting resource, and a control value corresponding to the first and second requesting resources.

2. The data processor of claim 1, wherein if a number of valid entries of the first requesting resource exceeds the first resource threshold and a number of valid entries of the second requesting resource exceeds the second resource threshold, the priority controller uses the control value to assign the priority to each of the first and second request.

3. The data processor of claim 1, wherein the storage circuitry comprises user programmable registers.

4. The data processor of claim 1, wherein the first resource threshold indicates a first level of the first requesting resource at which priority of the first request should be modified, and the second resource threshold indicates a second level of the second requesting resource at which priority of the second request should be modified.

5. The data processor of claim 1, wherein the priority controller further comprises comparing circuitry coupled to the storage circuitry.

6. The data processor of claim 1, where the priority controller further comprises a priority effectiveness monitor coupled to evaluate and selectively modify performance of the priority controller.

7. The data processor of claim 6, wherein selectively modifying performance of the priority controller comprises selectively modifying the threshold.

8. A processor, comprising:
a processing unit;
a cache coupled to the processing unit;
a write buffer coupled to the processing unit;
a priority controller, coupled to the processing unit, the cache, and the write buffer, the priority controller comprising:
priority rules specification circuitry, wherein the priority rules specification circuitry comprises a first programmable threshold register which stores a first threshold corresponding to the write buffer; and current priority resolution circuitry coupled to the priority rules specification circuitry which receives memory access requests from the cache and the write buffer and which prioritizes the memory access requests based at least on the first threshold.

9. The processor of claim 8, wherein the memory access requests are communicated via a same communications bus.

10. The processor of claim 8, wherein the cache comprises at least one of a data cache or an instruction cache.

11. The processor of claim 8, wherein the first programmable threshold register is capable of being reprogrammed during operation of the processor.

12. The processor of claim 8, further comprising a push buffer coupled to the cache, wherein the priority rules specification circuitry comprises a second programmable threshold register which stores a second threshold corresponding to the push buffer.

13. The processor of claim 8, wherein the priority rules specification circuitry comprises a subthreshold register which stores a subthreshold corresponding to the write buffer.

14. The processor of claim 11, wherein the priority controller further comprises a priority effectiveness monitor coupled to the priority rules specification circuitry which monitors operation of the processor.

15. The processor of claim 12, wherein the current priority resolution circuitry receives memory access requests from the push buffer and prioritizes the memory access requests from the cache, write buffer, and push buffer based one at least one of the first threshold and the second threshold.

16. The processor of claim 13, wherein the subthreshold register is user programmable.

17. The processor of claim 13, wherein the current priority resolution circuitry prioritizes the memory access requests based on the subthreshold.

18. The processor of claim 14, wherein the priority effectiveness monitor selectively reprograms the first programmable threshold register during operation of the processor.

19. A method for prioritizing requests in a data processor having a processing unit, a cache coupled to the processing unit, a write buffer coupled to the processing unit, and a bus interface unit coupled to the processing unit, the cache, and the write buffer, the bus interface unit adapted to be coupled to a communications bus and to service requests from the cache and the write buffer for use of the communications bus, a method comprising:

receiving a first communications bus access request from the cache and a second communications bus access request from the write buffer; and using a first threshold corresponding to the write buffer to determine which one of the first and second communications bus access requests pets priority, wherein the data processor comprises a push buffer coupled to the cache and to the bus interface unit, the bus interface unit adapted to service requests from the push buffer for use of the communications bus, the method for prioritizing requests further comprising:

receiving a third communications bus access request from the push buffer; and using a second threshold corresponding to the push buffer and the first threshold to determine which one of the first, second, and third communications bus access requests get priority.

20. The method of claim 19, further comprising:
modifying the first threshold.

21. The method of claim 19, further comprising:
monitoring operation of the data processor; and
in response to monitoring, selectively modifying the first threshold.

22. The method of claim 19, wherein the bus interface unit includes a control register, and wherein using the first threshold to determine which one of the first and second communications bus access requests gets priority comprises using the control register in addition to the first threshold to determine which one of the first and second communications bus access requests gets priority.

23. In a data processor having a processing unit, a write buffer coupled to the processing unit, and a bus interface unit coupled to the processing unit, the cache, and the write buffer, wherein the bus interface unit is adapted to be coupled to a communications bus and service requests from the write buffer, and the processing unit for use of the communications bus, a method comprising:

receiving an instruction prefetch request corresponding to an instruction prefetch buffer;

comparing a number of valid entries within the write buffer with a write buffer threshold to obtain a first comparison result;

comparing a number of valid entries within the instruction prefetch buffer with an instruction prefetch buffer threshold to obtain a second comparison result; and assigning a priority to the instruction prefetch request based on the first and second comparison results.

24. The method of claim 23, comprising:
receiving a second instruction prefetch request; and
modifying at least one of the write buffet threshold and the instruction prefetch buffer threshold prior to receiving the second instruction prefetch request.

25. The method of claim 23, wherein assigning the priority is selectively based further on a static control value.

26. The method of claim 23, wherein the data processor further comprises a cache coupled to the processing unit and the write buffer, wherein the write buffer comprises a push buffer.

27. The method of claim 23, further comprising:
receiving a data request; and
assigning a priority to the data request based on the first and second comparison results.

28. The method of claim 23, wherein assigning the priority is further based on a subthreshold value corresponding to at least one of the write buffer and the instruction prefetch buffer.

29. The method of claim 24, wherein the second instruction prefetch request requests an instruction sequential to an instruction requested by the instruction prefetch request.

30. The method of claim 25, wherein if the number of valid entries within the write buffer exceeds the write buffer threshold and the number of valid entries within the instruction prefetch buffer is below the instruction prefetch buffer threshold, assigning the priority is based further on the static control value.

31. A data processor, comprising:
processing unit;
a write buffer coupled to the processing unit; and
a bus interface unit coupled to the processing unit and the write buffer, wherein the bus interface unit is adapted to be coupled to a communications bus and service requests from the write buffer, and the processing unit for use of the communications bus, the bus interface unit comprising:

receiving means for receiving an instruction prefetch request corresponding to an instruction prefetch buffer;

first comparing means, coupled to die receiving means, for comparing a number of valid entries within the write buffer with a write buffer threshold to obtain a first comparison result;

second comparing means, coupled to the receiving means, for comparing a number of valid entries within the instruction prefetch buffer with an instruction prefetch buffer threshold to obtain a second comparison result; and priority means, coupled to the first and second comparing means, for assigning a priority to the instruction prefetch request based on the first and second comparison results.

32. The data processor of claim 31, further comprising modifying means for modifying at least one of the write buffer threshold and the instruction prefetch buffer threshold prior to receiving a second instruction prefetch request.

33. The data processor of claim 31, wherein the priority means assigns the priority based further on a subthreshold value corresponding to at least one of the write buffer and the instruction prefetch buffer.

34. In a data processor having a processing unit, the processing unit having a prefetch buffer, and a bus interface unit coupled to the processing unit, the bus interface unit adapted to be coupled to a communications bus and service requests from the prefetch buffer and the processing unit for use of the communications bus, a method comprising:

receiving a change of flow instruction fetch request;

comparing a number of entries within the prefetch buffer with a prefetch buffer threshold; and in response to comparing the number of entries, selectively affecting a priority of the change of flow instruction fetch request with respect to a request from the prefetch buffer for use of the communications bus.

35. The method of claim 34, wherein selectively affecting the priority of the change of flow instruction fetch request is based on a static control value corresponding to a priority policy for change of flow instructions.

36. A method for prioritizing requests in a data processor having a bus interface unit, adapted to be coupled to a communications bus and which services requests for use of the communications bus, a first requesting resource, and a second requesting resource, wherein the first and second requesting resources make requests for use of the communications bus, a method comprising:

selectively receiving a first request from a first resource and selectively receiving a second request from a second resource;

if the first request and the second request are received, using a threshold corresponding to one of the first resource and the second resource to assign priorities to the first and second request; and if the first request and the second request are not received:

comparing a number of entries within the first requesting resource to a first requesting resource threshold and comparing a number of entries within the second requesting resource to a second requesting resource threshold; and if the number of entries within the first requesting resource falls below the first requesting resource threshold and the number of entries within the second requesting resource falls below the second requesting resource threshold, using a subthreshold corresponding to one of the first requesting resource and the second requesting resource to assign priorities to the first and second request.

37. The method of claim 36, wherein the first resource is one of a write buffer, a prefetch buffer, and a push buffer, and the second resource is one of a write buffer, a prefetch buffer, and a push buffer.

* * * * *

UNITED STATES PATENT AND TRADEMARK OFFICE
CERTIFICATE OF CORRECTION

PATENT NO. : 6,832,280 B2
DATED : December 14, 2004
INVENTOR(S) : Afzal M. Malik et al.

It is certified that error appears in the above-identified patent and that said Letters Patent is hereby corrected as shown below:

Column 14,
Line 12, delete "counted" and replace with -- coupled --.

Column 15,
Line 56, delete "pets" and replace with -- gets --.

Column 17,
Line 6, delete "die" and replace with -- the --.

Signed and Sealed this

Thirtieth Day of August, 2005

JON W. DUDAS
*Director of the United States Patent and Trademark Office*